US006494518B2

(12) United States Patent
Kreil et al.

(10) Patent No.: US 6,494,518 B2
(45) Date of Patent: Dec. 17, 2002

(54) ROOM SLIDE OUT ACTUATOR WITH SLOTTED RAIL SHAFT CAGE

(75) Inventors: Craig J. Kreil, Oshkosh, WI (US); Kurt H. Ott, Beaver Dam, WI (US); Brian J. Wheeler, Pardeeville, WI (US); Robert H. Schneider, Beaver Dam, WI (US)

(73) Assignee: Actuant Corp., Milwaukee, WI (US)

( * ) Notice: Subject to any disclaimer, the term of this patent is extended or adjusted under 35 U.S.C. 154(b) by 0 days.

(21) Appl. No.: 09/995,048

(22) Filed: Nov. 27, 2001

(65) Prior Publication Data

US 2002/0093213 A1 Jul. 18, 2002

Related U.S. Application Data

(60) Provisional application No. 60/251,262, filed on Dec. 4, 2000.

(51) Int. Cl.[7] .................................................. B60P 3/34

(52) U.S. Cl. ................................ 296/26.01; 296/26.13; 296/26.14

(58) Field of Search .............................. 296/26.01, 175, 296/26.13, 171, 26.12, 26.14; 52/67; 254/424

(56) References Cited

U.S. PATENT DOCUMENTS

| | | | | | |
|---|---|---|---|---|---|
| 5,658,032 | A | * | 8/1997 | Gardner | 296/26.01 |
| 5,758,918 | A | * | 6/1998 | Schneider et al. | 296/26.13 |
| 5,833,296 | A | * | 11/1998 | Schneider | 296/26.13 |
| 5,902,001 | A | * | 5/1999 | Schneider | 296/26.13 |
| 5,984,396 | A | * | 11/1999 | Schneider | 296/26.13 |
| 6,109,683 | A | * | 8/2000 | Schneider | 296/26.14 |
| 6,116,671 | A | * | 9/2000 | Schneider | 296/26.01 |
| 6,224,102 | B1 | * | 5/2001 | Nebel | 254/424 |
| 6,234,566 | B1 | * | 5/2001 | Cyr et al. | 296/26.13 |
| 6,286,883 | B1 | * | 9/2001 | Schneider et al. | 296/26.13 |
| 6,293,611 | B1 | * | 9/2001 | Schneider et al. | 296/26.14 |
| 6,338,523 | B1 | * | 1/2002 | Rasmussen | 296/26.01 |
| 6,415,675 | B1 | * | 7/2002 | Schneider et al. | 296/26.13 |
| 6,428,073 | B1 | * | 8/2002 | Blodgett, Jr. | 296/26.13 |
| 2002/0047286 | A1 | * | 4/2001 | Nye et al. | 296/26.01 |
| 2002/0056329 | A1 | * | 5/2002 | Rasmussen | 296/26.01 |

FOREIGN PATENT DOCUMENTS

| | | | |
|---|---|---|---|
| WO | WO 98/56613 | * | 12/1998 |
| WO | WO 01/53132 | * | 7/2001 |

* cited by examiner

*Primary Examiner*—Kiran Patel
(74) *Attorney, Agent, or Firm*—Quarles & Brady LLP

(57) ABSTRACT

A slide-out mechanism for laterally moving a platform relative to a stationary floor fixed to a vehicle between a retracted position and an extended position which is easily assembled and adjusted. The mechanism includes a first member fixed relative to the platform, and a second member telescopically mounted to the first member for slidable movement between an extended position and retracted position. A rail shaft cage mounted to the first member has a pair of sides with a slot formed in each of the sides, and a rail shaft assembly having a rotatable shaft, wherein the shaft is supported by the slots. In one embodiment, the slide-out mechanism includes bearings having inner and outer races mounted on the shaft, and each bearing outer race is supported by the slot cradle. A portion of the slot and the outer race are polygonal shaped, and the bearing inner race is eccentrically mounted in the outer race, wherein rotating the outer race in the cradle changes the relation between the shaft and the first member. In still another embodiment, a flute tube is used to connect the rail shaft to a coupling shaft which rotatably drives a second rail shaft of a second rail shaft assembly. The second rail shaft assembly drives another second member parallel to the first second member. The flute tube simplifies synchronizing the parallel members of the slide-out mechanism.

7 Claims, 8 Drawing Sheets

ROOM SLIDE OUT ACTUATOR WITH SLOTTED RAIL SHAFT CAGE

CROSS REFERENCES TO RELATED APPLICATIONS

This application claims the priority benefit of U.S. Provisional Patent Application No. 60/251,262 filed on Dec. 4, 2000.

STATEMENT REGARDING FEDERALLY SPONSORED RESEARCH

Not Applicable

BACKGROUND OF THE INVENTION

This invention relates to vehicles having expandable room sections, and more particularly to an improved actuator for moving a room slide out between extended and retracted positions relative to the vehicle.

In order to increase the available interior space of recreational vehicles or trailers, it is known to provide a room slide-out as part of the structure of the vehicle or trailer. A room slide out is a raised platform, which can be used as a sleeping platform and is enclosed on all but one side. During transit, the slide-out section is retracted and stored in the interior of the vehicle or trailer, with the exterior wall of the slide-out room section approximately flush with the exterior of the vehicle or trailer. To use the slide-out section, the vehicle is first parked and leveled. The slide-out room section is then slid outward from the vehicle to an extended position, increasing the interior space of the vehicle.

Prior art constructions include an inner rail which is movable relative to an outer rail. The slide-out room is fixed relative to the inner rail, and a mechanism drives the inner rail relative to the outer rail. In the prior art constructions, the mechanism for moving the slide-out section relative to the stationary room section is fixed to the vehicle body, and pushes the room slide-out away from the vehicle when extending the slide-out room, and pulls the slide-out section towards the vehicle when retracting the room. The mechanism includes a rail shaft, bearings, and possibly other components, such as rollers and a pinion which are assembled in a rail shaft cage which has been welded to an outer rail. Assembly of the mechanism in the rail shaft cage is awkward and difficult. Moreover, the shaft is fixed relative to the inner rail without a simple means for adjustment.

SUMMARY OF THE INVENTION

The present invention provides a slide-out mechanism for laterally moving a platform relative to a stationary floor fixed to a vehicle between a retracted position and an extended position which is easily assembled and adjusted. The mechanism includes a first member fixed relative to the platform, and a second member telescopically mounted to the first member for slidable movement between an extended position and retracted position. A rail shaft cage mounted to the first member has a pair of sides with a slot formed in each of the sides, and a rail shaft assembly having a rotatable shaft, wherein the shaft is supported by the slots.

In one aspect of the invention, at least one of the slide-out mechanism slots has a first portion with one end open to an edge of the cage side, and extending substantially parallel to the first member, and a second portion extending from the other end of the first portion, and extending away from the first member to form a cradle which receives and supports the shaft.

In another aspect of the invention, the slide-out mechanism includes bearings having inner and outer races mounted on the shaft, and each bearing outer race is received in one of the slots and supported by the rail cage sides.

In yet another aspect of the slide-out mechanism, at least a portion of the slot and outer race are polygonal shaped, and the bearing inner race is eccentrically mounted in the outer race, wherein rotating the outer race in the slot changes the relation between the shaft and the first member.

In still other aspects of the slide-out mechanism, a flute tube is used to connect the rail shaft to a coupling shaft which rotatably drives a second rail shaft of a second rail shaft assembly. The second rail shaft assembly drives another second member parallel to the first second member. The flute tube simplifies synchronizing the parallel members of the slide-out mechanism.

The foregoing and other objects and advantages of the invention will appear from the following description. In the description, reference is made to the accompanying drawings which form a part hereof, and in which there is shown by way of illustration a preferred embodiment of the invention.

DETAILED DESCRIPTION OF THE INVENTION

An expandable room slide out attached to a known trailer or recreational vehicle which provides distinct advantages over the prior art as will be described and appreciated hereafter. In the preferred embodiment, the trailer or recreational vehicle (generally referred to as the vehicle) is equipped with a slide-out section used to provide additional interior room space. However, it should be understood that the invention can also apply to expandable sections or compartments provided on other vehicles for use in construction, military, medical, education, mobile broadcast and other applications, to expand the inside volume of the vehicle.

Figure 1:
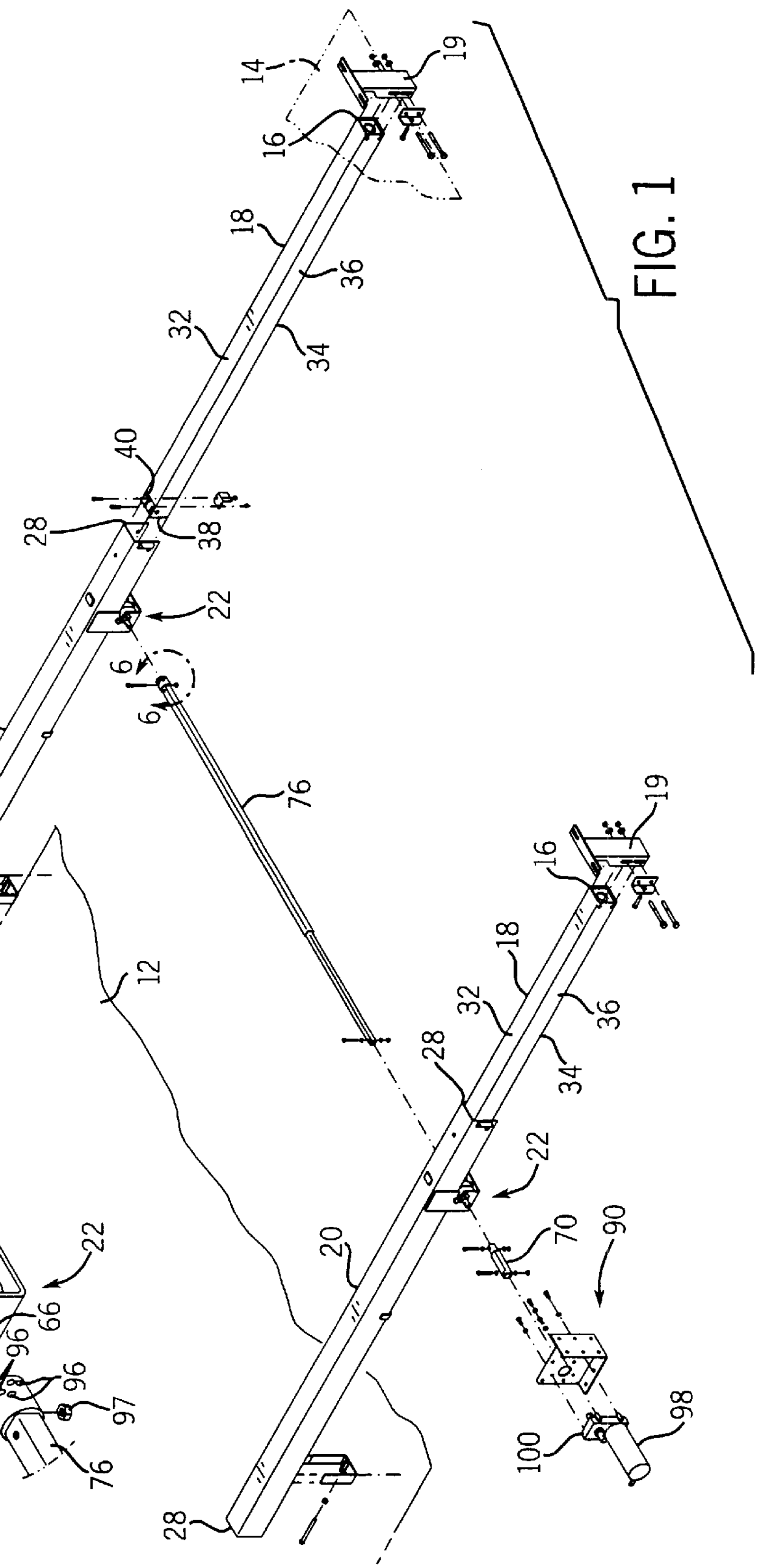
FIG. 1 is a perspective top view of a slide-out mechanism incorporating the present invention mounted thereon.
Figure 2:
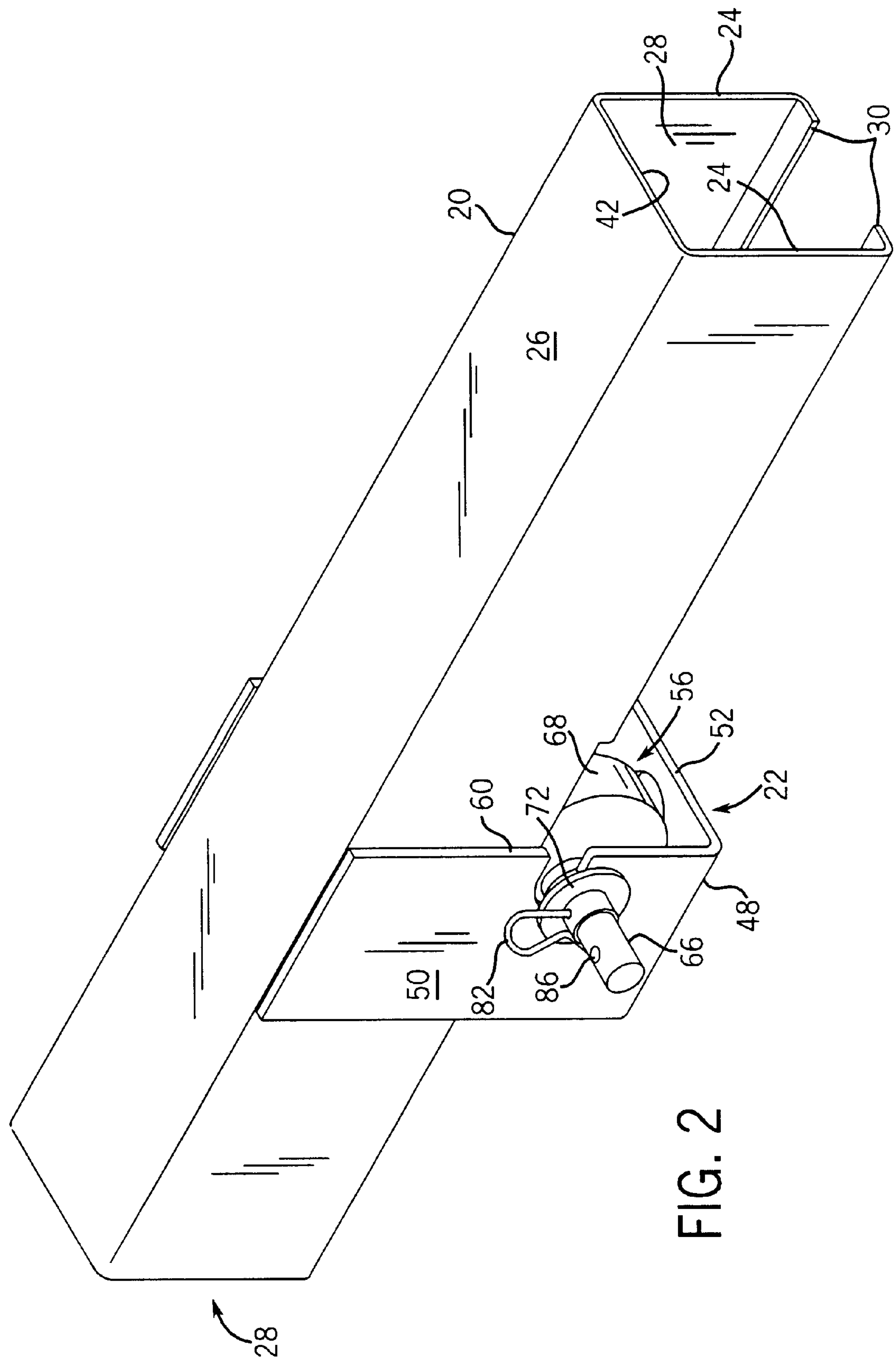
FIG. 2 is a detailed perspective view of an actuator of FIG. 1.

Referring now to FIGS. 1 and 2, a room slide out mechanism 10 is mounted to a vehicle stationary floor 12. The room slide out mechanism 10 has a movable platform 14 mounted to outer ends 16 of a pair of inner box-shaped rails, or channels, 18 using methods known in the art, such as mounting brackets 19. Each inner channel 18 is slidably mounted in an outer channel 20 and the outer end 16 of the inner channel 18 telescopes from the respective outer channel 20 between extended and retracted positions. An actuator 22 mounted to each outer channel 20 engages the respective inner channel 18 to extend and retract the movable platform 12 by forcibly sliding the inner channel 18.

Each U-shaped outer channel 20 is rigidly mounted to the vehicle stationary floor 12 below the movable platform 14, and has a two opposing sides 24 joined by a top surface 26, and opposing open ends 28. Projections 30 extending inwardly from a bottom edge of each side 24 can provide support for the inner channel 18 disposed in the outer channel 20.

Figure 3:
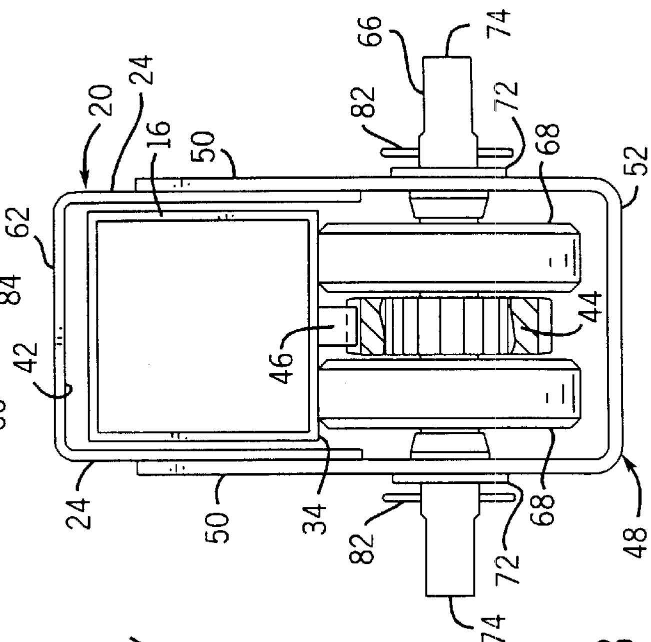
FIG. 3 is a cross sectional view of the slide out actuator along line 3—3 of FIG. 1.
Figure 4:
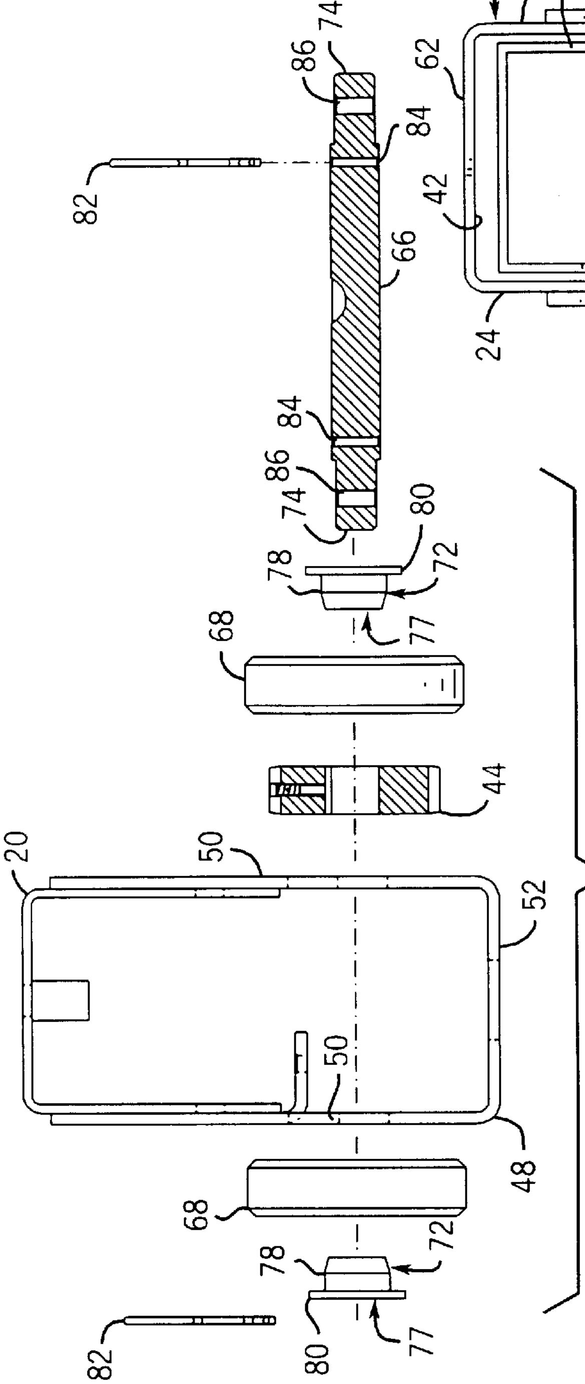
FIG. 4 is an exploded view of the actuator of FIG. 4.
Figure 5:
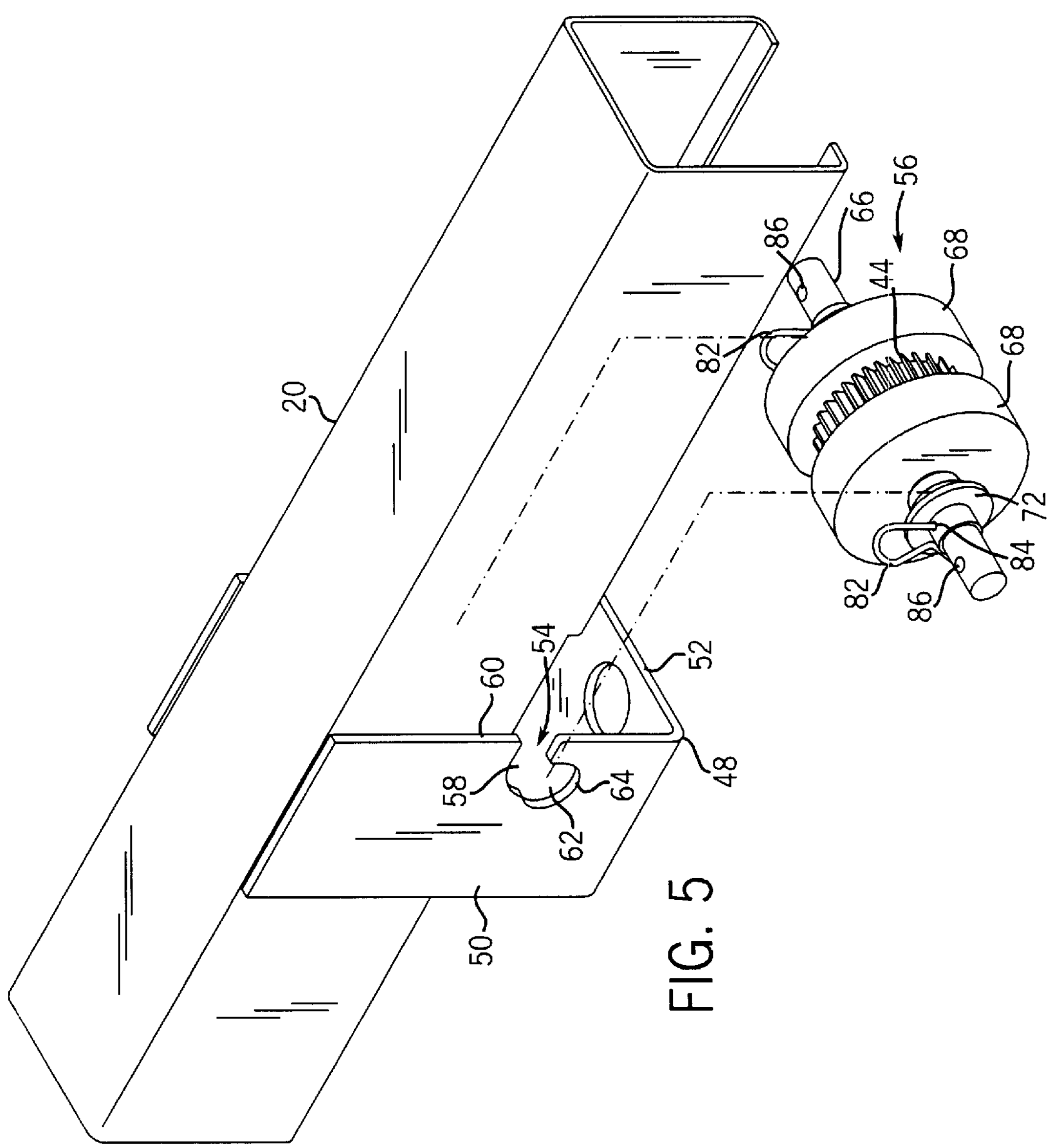
FIG. 5 is a partial exploded view of the actuator of FIG. 2.
Figure 7:
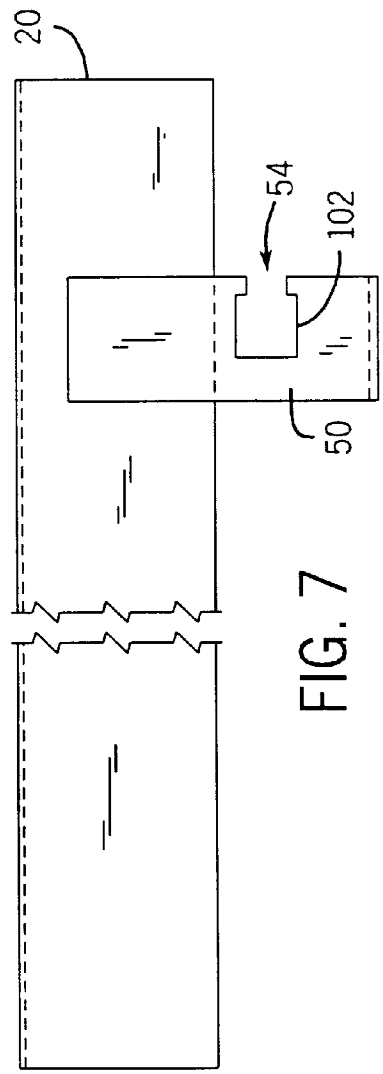
FIG. 7 is a side view of an alternative rail shaft cage.
Figure 8:
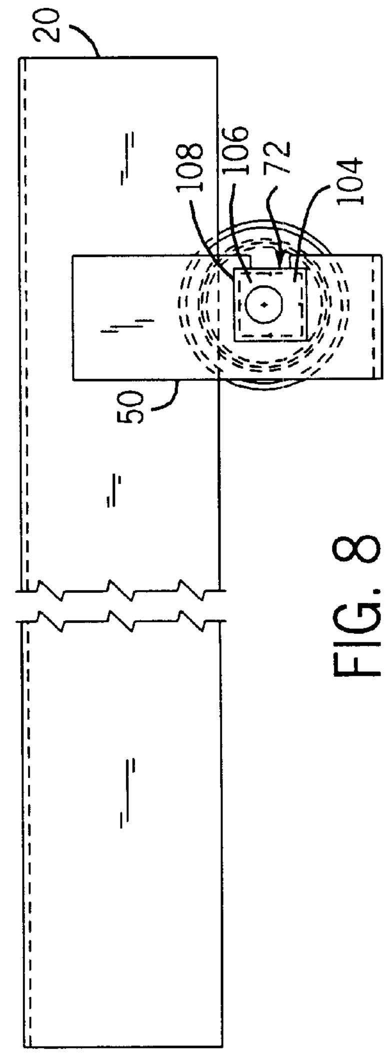
FIG. 8 is a side view of an assembled actuator incorporating the rail shaft cage of FIG. 7.
Figure 10:
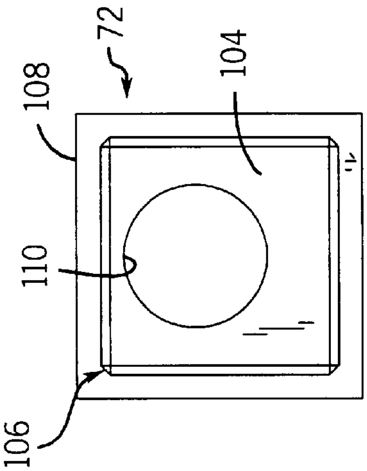
FIG. 10 is a front view of the bearing of FIG. 9.
Figure 9:
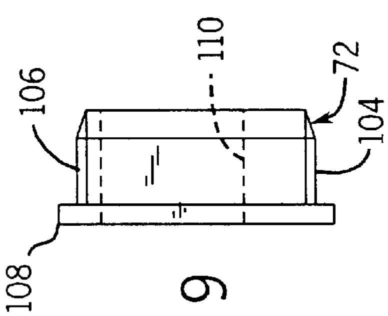
FIG. 9 is a side view of a bearing of FIG. 8.

The inner channel 18 is slidably disposed in the outer channel 20, and has a top surface 32 and a bottom surface 34 joined by sides 36. An inner end 38 is disposed in the outer channel 20, and the outer end 16 projects out of one of the outer channel ends 28. Rollers 40 rotatably mounted to the inner channel 18 proximal the inner end 38 engage the outer channel top inner surface 42 to reduce friction as the inner channel 18 slides relative to the outer channel 20. The inner channel bottom surface 34 engages the actuator 22 to urge the channel 18 in the desired direction. Preferably, the actuator 22 includes a pinion 44 which engages a rack 46 (shown in FIG. 3) fixed to the bottom surface 34 to drive the inner channel 18 between the extended and retracted positions.

As shown in FIGS. 1–5, the slide out actuator 22 has a U-shaped rail shaft cage 48 fixed to the outer channel 20, and engages the inner channel 18 extend and retract the movable platform 14. The rail shaft cage 48 includes opposing sides 50 joined by a bottom plate 52. Each side 50 is a plate having a generally hook-shaped slot 54 which supports a rail shaft assembly 56.

Each slot 54 has a first portion 58 open to a front edge 60 of the cage side 50 and extending substantially parallel to the side of the outer channel 20. A slot second portion 62 extends from the first portion 58 away from the outer channel 20 to form a cradle 64 which receives and supports the rail shaft assembly 56. Of course, other slot shapes, such as described in more detail below, can be used which receive and support the rail shaft assembly without departing from the scope of the present invention.

The rail shaft assembly 56 includes a rail shaft 66 which supports a pair of rollers 68 and is rotatably driven by a drive shaft 70 (shown in FIG. 1). The rail shaft 66 extends between the cage sides 50, and is supported at each end by the cradles 64. The rail shaft 66 is rotatably mounted in a bearing 72 proximal each end 74 of the shaft 66 and slipped into one of the cradles 64.

Each bearing 72 has an inner race 77 rotationally fixed to the shaft 66, and an outer race 78 which engages the rail shaft cage cradle 64. Rollers or balls (not shown) interposed between the inner race 77 and outer race 78 allows the inner race 77 to freely rotate relative to the outer race 78 about an axis. The outer race 78 includes a collar 80 which is larger than the slot 54, and prevents the bearing 72 from sliding axially along the shaft 66 through the slot 54 in the cage side 50. A clip 82 inserted through a radial throughbore 84 formed in the shaft 66 adjacent to the bearing 72 prevent the bearing 72 from sliding axially along the shaft 66 out of the slot cradle 64.

The rollers 68 are fixed to the shaft 66 between the bearings 72, and engage the bottom surface 34 of the inner channel 18 to reduce friction as the inner channel 18 slides relative to the outer channel 20. Of course, the rollers 68 can be rotatably driven by the shaft 66 to drive the inner channel 18 between the extended and retracted positions, and the rack 46 and pinion 44 can be eliminated.

The pinion 44 is mounted to the shaft 66, and is interposed between the rollers 68 to maintain a spaced relation between the rollers 68. The pinion 44 engages the rack 46 fixed to the inner channel bottom surface 34 to drive the inner channel 18 between the extended and retracted positions.

The shaft ends 74 extending axially outwardly from the bearings 72 are necked down to mate with the drive shaft 70 on one end 74 and a coupling shaft 76 on the other end 74. A radial throughbore 86 formed proximal each shaft end 74 receives a bolt 88 to couple the rail shaft 66 to the rotatably driven drive shaft 70 to rotatably drive the rail shaft 66. The other end 74 of the shaft 66 is similarly configured, and has radial throughbore 86 for coupling the coupling shaft 76 which drives the rail shaft 66 of the adjacent actuator 22.

Referring to FIGS. 1, a motor assembly 90 mounted adjacent the rail cage shaft 66 includes an electric motor 90 coupled to a gear box 100 which rotatably drive the drive shaft 70. An end of the drive shaft 70 is coupled to an end of the rail shaft 66 to rotatably drive the rail shaft 66. An opposing end of the rail shaft 66 is coupled to an end of the coupling shaft 76 to rotatably drive the coupling shaft 76. An opposing end of the coupling shaft 76 is coupled to the second rail shaft 66 which forms part of a second actuator 22 driving the parallel inner channel 18. The coupling shaft 76 rotatably drives the second rail shaft 66.

Figure 6:
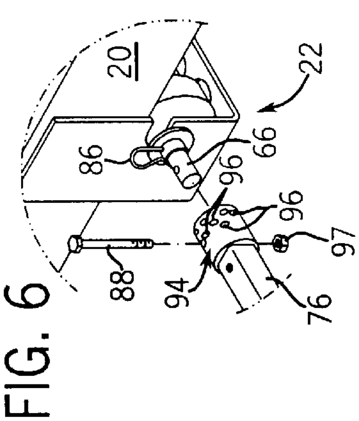
FIG. 6 is a detailed perspective view along line 6—6 of FIG. 1.

As shown in FIG. 6, the opposing coupling shaft end includes a flute tube 94 which slips over the end 74 of the rail shaft 66. The flute tube 94 includes a plurality of pairs of radially aligned holes 96 formed therein. One pair of the aligned holes 96 are aligned with the radial throughbore 86 formed proximal the rail shaft end 74, and the bolt 88 is slipped through the aligned holes 96 and throughbore 86 to couple the shafts 66, 76 together. An internally threaded nut 97 threadably engages an externally threaded end of the bolt to retain the bolt 88 in the throughbore 86.

Advantageously, a flute tube 94, such as described above, links the coupling shaft 76 to the second actuator 22 to synchronize the slidable movement of the parallel inner channels 18 as they move between the extended and retracted positions. In particular, the flute tube connection allows selection of a pair of radially aligned holes that line up when the shaft radial throughbore in the rail shaft is in a position that results in both inner channel positions are synchronized to result in a correct sealing of the slide-out room to the stationary wall of the recreational vehicle, both when extended and retracted. The flute tube can be used to couple any of the shaft ends, such as the drive shaft 70 to the first rail shaft 66, without departing from the scope of the present invention.

Advantageously, the rail shaft assembly 56 can be preassembled and slipped into the slots 58 to minimize assembly time. The flute tube 94 simplifies connecting the drive shaft 70 and coupling shaft 76 to the rail shaft assemblies 56. Preassembling the rail shaft assembly 56 and providing a simple means for coupling the rail shaft assembly 56 to other shafts allows an assembler to assemble the assembly 56 on a bench or other ergonomically acceptable work space.

Alternative slot shapes can be used, such as a slot having a square portion, which can provide flexibility to adjust the rail shaft center of rotation relative to the outer channel 20. As shown in FIGS. 7–10, the rail case side 50 includes a slot 54 having a square portion 102. The bearings 72 supporting the rail shaft 66 include a bearing outer race 104 having a square outer frame 106 with a collar 108. The outer race frame 106 slips into the slot square portion 102, and the collar 108 prevents the bearing from slipping axially through the slot 54.

Figure 11:
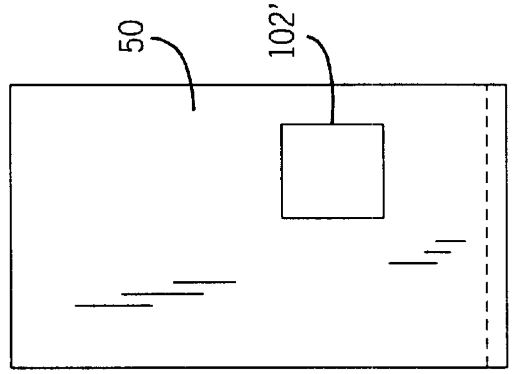
FIG. 11 is a side view of another alternative rail shaft cage.

The bearing inner race 110 is eccentrically mounted in the frame 106, such that rotation of the outer race frame 106 in the slot square portion 102 changes the inner race location in the square portion 102, and thus changes the rail shaft center of rotation relative to the outer channel 20. Of course, a rail shaft assembly having bearings with an eccentrically positioned inner race in an outer race assembly having any polygon shape can be provided without departing from the scope of the present invention. In fact, increasing the number of equal sides of the polygon shape increases the adjustability of the rail shaft center of rotation. Advantageously, a rail shaft cage, such as shown in FIG. 11, which has a polygonal shaped aperture can be used instead of a slot to provide flexibility to adjust the rail shaft center of rotation relative to the outer channel 20.

Figure 14:
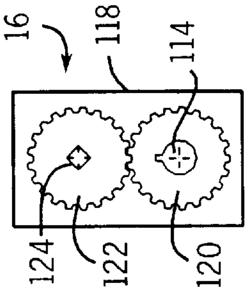
FIG. 14 is a cross sectional view of the gearbox of FIG. 13.
Figure 12:
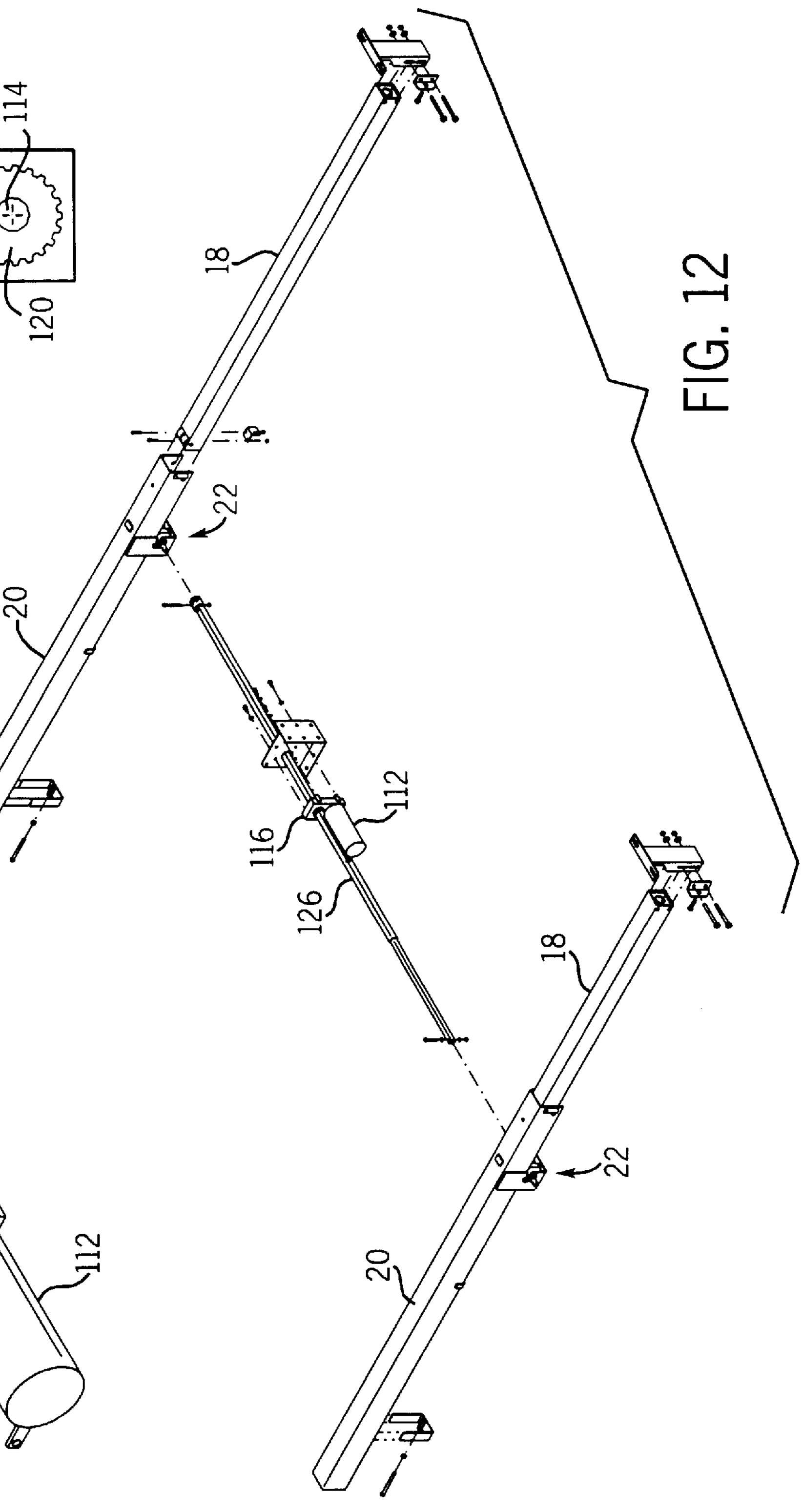
FIG. 12 is an alternative slide out mechanism incorporating the present invention.
Figure 13:
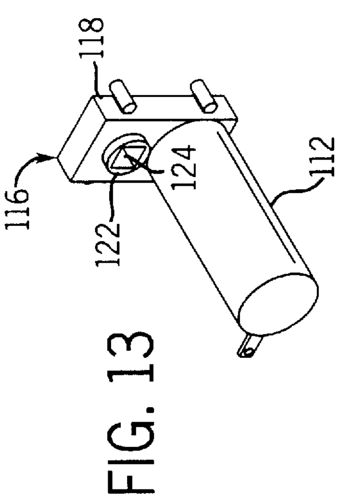
FIG. 13 is a detailed view of a motor and gearbox of FIG. 12.

Alternate methods for mounting the motor assembly can also be used without departing from the scope of the present invention. For example, as shown in FIGS. 12-14, an electric motor 112 has a rotatably driven shaft 114 which is coupled to a gearbox 116. The gearbox 116 includes a housing 118 which rotatably mounts a first gear 120 coupled to the shaft 114, and a second gear 122 which intermeshes with the first gear 120. An axial square aperture 124 is formed in the center of the second gear 122 which receives a coupling shaft 126. Of course, any number of gears can be used to transfer the rotational force from the shaft 114 to the coupling shaft 126 without departing from the scope of the present invention.

Figure 15:
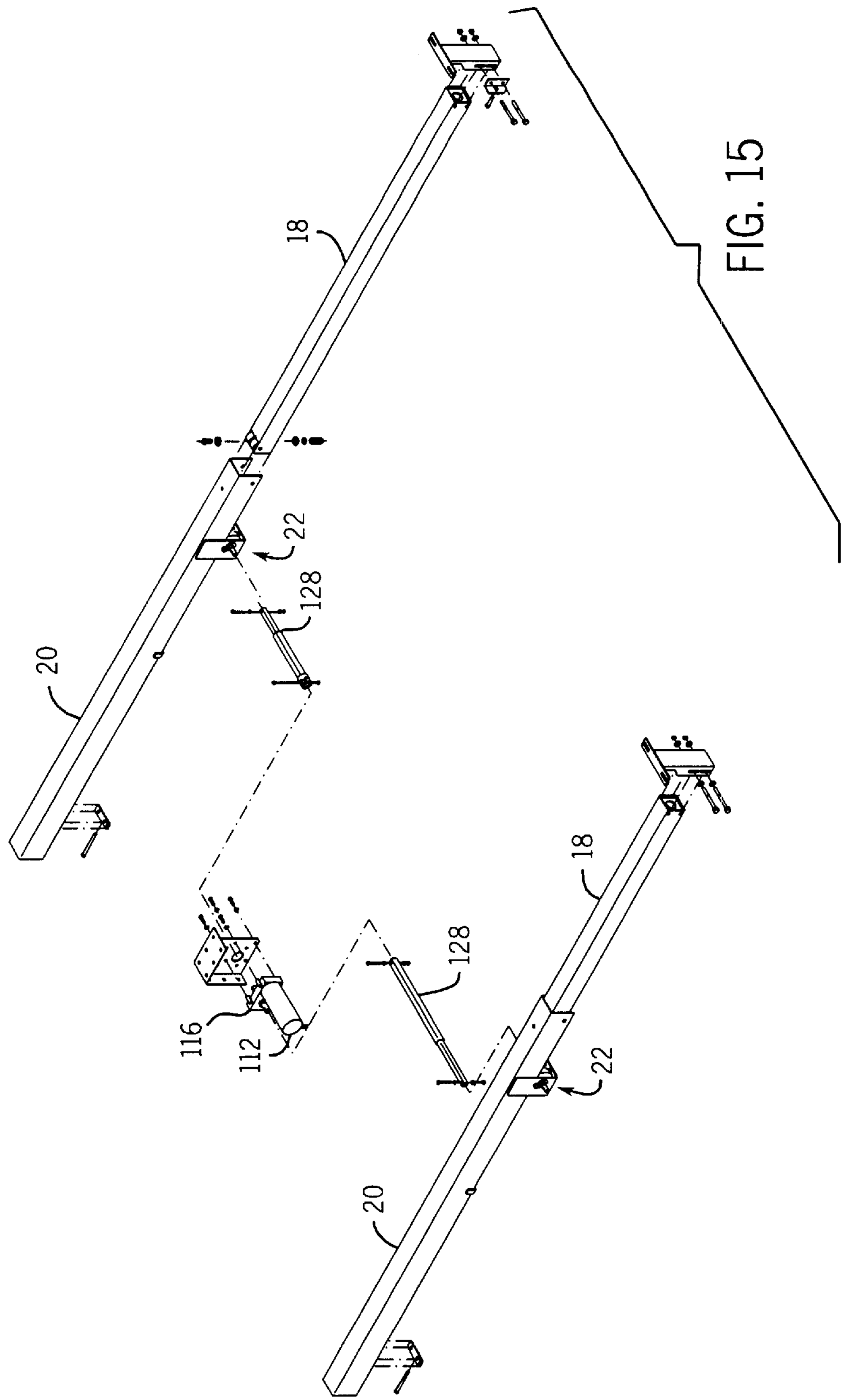
FIG. 15 is another alternative slide-out mechanism incorporating the present invention.

The coupling shaft 126 has a square cross sectional shape which slips axially through the square aperture 124, and rotation of the gears 120, 122 rotatably drives the coupling shaft 126. Each end of the coupling shaft is coupled to a rail shaft assembly 56, such that rotation of the coupling shaft 126 rotatably drives the rail shaft assembly 56 to drive the inner channel 18 between the extended and retracted positions. Of course, the coupling shaft cross sectional shape and gear aperture can be any shape, such as triangular, rectangular, hexagonal, oval, circular with a key, and the like, which corresponds to the gear aperture shape, to transfer the rotational force from the second gear to the coupling shaft. Advantageously, by providing a coupling shaft which slips axially through the gear aperture, the motor assembly can be conveniently mounted anywhere along the length of the shaft. In addition, as shown in FIG. 15, the coupling shaft can be formed from more than one shaft piece 128 to accommodate different spacing requirements between the two parallel outer channels 18.

We claim:

1. An operating mechanism for laterally moving a platform between a retracted position and an extended position relative to a stationary floor fixed to a vehicle, said mechanism comprising;

a first member fixed relative to the vehicle;

a second member telescopically mounted to said first member for slidable movement between extended and retracted positions, and fixed relative to the platform;

a rail shaft cage mounted to said first member, and having opposing sides;

a slot formed in each of said sides; and a rail shaft assembly having a rotatable shaft received in said slots and supported by said sides.

2. The operating mechanism of claim 1, in which at least one of said slots has a first portion open to an edge of said cage side and a second portion extending downwardly from said first portion, wherein said shaft is received in said at least one of said slots through said first portion, and said shaft is supported by said sides when disposed in said second portion.

3. The operating mechanism of claim 2, in which said rail shaft assembly includes a bearing having an inner and outer race mounted on said shaft, and said outer race engages said second portion of one of said slots.

4. The operating mechanism of claim 3, in which said slot second portion is polygonal shaped, and said bearing inner race is eccentrically mounted in said outer race, wherein rotating said outer race in said second portion changes the relation between said shaft and said first member.

5. The operating mechanism of claim 1, in which a rack is fixed relative to a surface of said second member, and a rotatably driven pinion forming part of said rail shaft assembly engages said rack to drive said second member between said extended and retracted positions.

6. The operating mechanism of claim 1, in which at least one roller is mounted to said shaft, and said roller engages a surface of said second member.

7. The operating mechanism of claim 6, in which said roller drives said second member between said extended and retracted positions.

* * * * *